Nov. 1, 1932.     R. GUNN     1,886,336
INDUCTION COMPASS
Filed July 30, 1927     2 Sheets-Sheet 1

Inventor
Ross Gunn
By Wooster & Davis
Attorneys.

Nov. 1, 1932.  R. GUNN  1,886,336
INDUCTION COMPASS
Filed July 30, 1927  2 Sheets-Sheet 2

Inventor
Ross Gunn
By Wooster & Davis
Attorneys.

Patented Nov. 1, 1932

1,886,336

UNITED STATES PATENT OFFICE

ROSS GUNN, OF WASHINGTON, DISTRICT OF COLUMBIA

INDUCTION COMPASS

Application filed July 30, 1927. Serial No. 209,598.

This invention relates to an earth induction compass, and especially to a compass of this type having particular application in aircraft or other moving vehicles. It is an object of the invention to provide an induction type compass which will be very simple in construction and reliable in operation, and which is capable of being mounted well clear of magnetic material used in constructing the vehicle; one that will have low wind resistance and will indicate at any convenient point the bearing and particularly the direction of any deviation from the desired course. In other words the indicating element of this device may be located at any point desired and will indicate not only the bearing but also the direction of any deviation from the desired course. One of the principal objections of some of the induction compasses as heretofore constructed has been that although they indicate a deviation from the desired course they do not indicate the direction of this deviation. This objection is overcome in the present instrument.

With the foregoing and other objects in view, I have devised the constructions illustrated diagrammatically in the accompanying drawings forming a part of this specification. In these drawings, Fig. 1 is a diagrammatical view showing one of the simplest forms of the device.

It is well known that certain magnetic materials, notably certain kinds of alloy steel, soft iron and various other alloys magnetize in the earth's field, and moreover, they follow rather closely this magnetic field when it goes through any variation or change of magnitude or direction. The element of magnetic material may be made to follow almost exactly the impressed field if this material is constantly demagnetized either by means of an alternating current or by mechanical means, i. e. jarring. Certain special alloys, for example, permalloy or permivar, will follow the impressed field without recourse to special methods. Obviously such material would be most convenient for use in this device since it permits the greatest simplicity of construction, but other materials are satisfactory as used with the demagnetizing means.

The present invention is made up in general of the following components, although certain of these components are not necessary for the operation of the invention. In general it comprises the elements notated as follows:

(1) Rods of magnetic material to concentrate the magnetic flux of the earth's field at the desired point or points.

(2) A device to periodically increase and decrease the reluctance of the magnetic path or paths. This may be a rotating toothed wheel or in the simplest case may be a vibrator of magnetic material.

(3) Means for rotating the toothed wheel or maintaining the vibrator in vibration.

(4) Armature coils so arranged that the change in flux due to change in the reluctance of the magnetic path produces an induced electromotive force in the coils.

(5) A rectifying device arranged to rectify the electromotive force in the armature coils, for example, a set of rectifying contacts arranged to always operate in synchronism with the rotator or vibrator.

(6) An indicating device consisting of a sensitive D. C. meter.

(7) A mounting for suitably orienting the compass proper with respect to the vehicle.

(8) When the magnetic material does not faithfully follow the impressed field it may be made to follow the field either by (a) demagnetizing this material by constant jarring or better by (b) providing the magnetic collecting rods with an auxiliary winding and exciting this winding with alternating current in such a manner as to constantly demagnetize the collecting rods without affecting materially the electromotive force induced in the field coils.

Figure 1:
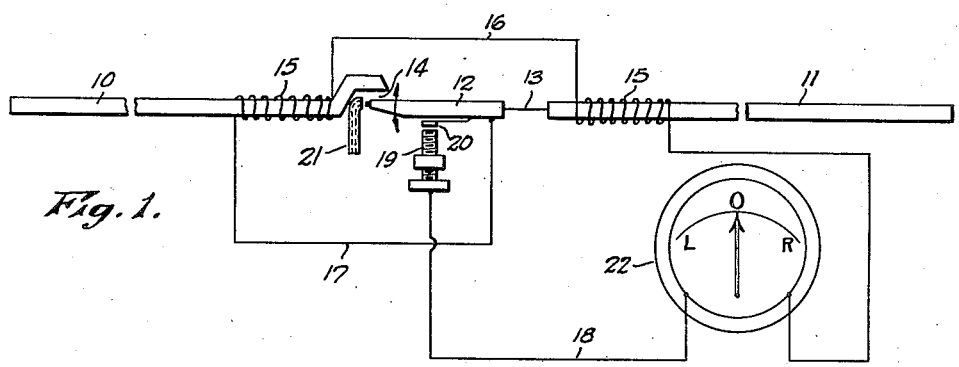

Referring to the accompanying drawings Fig. 1 shows the simplest arrangement. In this form 10 and 11 represent the means for concentrating the magnetic flux of the earth's magnetic field, and they are made of suitable magnetic material, such as soft iron or various alloys as mentioned above. There is a vibrator section 12 also of magnetic material connected to the member 11 by a spring 13 and separated from the member 10 by an air gap 14. The air gap between 11 and 12 is kept small by proper construction. Associated with the flux concentrating members are the armature coils 15 connected in circuit by the connection 16 and the wires 17 and 18 with the make and break contacts 19 and 20. The contact 19 is mounted so that it is adjustable while the contact 20 associated therewith is carried by the vibrating element 12. This element is made to vibrate by any suitable means, such as a blast of air from a tube 21 projected against the element, and will make it vibrate at a constant frequency, as indicated by the arrows, toward and from the flux concentrating element 10 and the contact 19. It will thus periodically vary the width of the air gap 14 and will make and break the circuit through the contacts 19 and 20 in synchronism with the vibration of the member 12. In the circuit 18 of the armature coils 15 is located the indicating device 22, such as a sensitive direct current meter.

The operation of this device is as follows: The concentrating elements 10 and 11 together with the associated elements are mounted at any suitable position on the aircraft or the vehicle, and this mounting (not shown) preferably includes adjusting elements so that the concentrating elements 10 and 11 may be properly oriented with respect to the vehicle. It will be apparent that when the elements 10 and 11 are in parallel with the earth's magnetic field there will be the greatest concentration of flux by these elements, and therefore, the maximum induced E. M. F., and when these elements are at right angles to the earth's magnetic field there will be a minimum or zero concentration of flux and the minimum or zero induced E. M. F. Therefore, it is evident that the orientation of the flux concentrating elements corresponding to zero induced E. M. F. is the orientation which is chosen to indicate when the vehicle is "on course". It is also clear that mechanical deviations to either side of the selected course will produce E. M. F.'s which are of opposite signs and hence the mechanical deviations are capable of indication on a direct current indicator. For different desired courses it is necessary to orient the generator system with respect to the plane and this may be accomplished by any suitable system (not shown) comprising for example a crank and scale, a flexible shaft and gearing so that the pilot may control from his seat the angular position with respect to the aircraft of the magnetic system which may be conveniently mounted in the tail. Or it may be merely placed and secured in position on the ship before starting out and left in this position for any given course. Since any compass operates only with the horizontal component of the earth's field the flux concentrating mechanisms frame and reluctance variation mechanisms may be conveniently mounted on gimbals in order that the concentrating elements will lie normally in a horizontal plane. Such a mounting does not guarantee that the concentrating element will lie in a horizontal plane for the accelerations in an aircraft are large and a pendulous system is not always perpendicular to the earth's surface. Nothing simple can be done to correct for these errors and experience shows that not so much is to be gained by mounting the system in gimbals as might be supposed. Certain installations have been made in which orientation of the generator system about a fixed axis only was used and the flux concentrating elements were in a horizontal plane only when the plane was in its normal attitude in flight. The deviations encountered due to pitch and roll were not much worse than the deviations encountered when the system was mounted on gimbals. Thus the most essential orienting mechanism is a mechanism which turns the compass so that, when the ship is "on course" the concentrating elements are perpendicular to the earth's magnetic field. Orientation in a horizontal plane is desirable but not necessary since the pilot flies the aircraft so that the concentrating elements can be made to lie largely in the horizontal plane. In other words, after the course on which it is desired to fly the ship is decided upon the flux concentrating elements are so placed on the ship that they will lie in the east-westerly direction or at right angles to the earth's magnetic field when the ship is proceeding on this course. In this position the indicator pointer is on zero as there is no induced E. M. F. Thus, as long as the ship remains "on course" the pointer remains at zero, but as soon as the ship deviates laterally in either direction from the determined course the pointer will move to the right or left according to in which direction the deviation occurs, and the amount of deflection of the pointer will be an indication of the amount of deviation of the ship from the desired course. That is to say, the phase relation of the vibrating elements is essentially constant and if the generated A. C. E. M. F. has its phase reversed by reversing the direction of the impressed magnetic field (when the flux concentrating elements move from one side to the other of the zero position or position at right angles to the earth's magnetic field) the rectified component is changed in sign and the direct current indicator reads in a direction opposite to the first reading. The direction of the magnetic field in the flux concentrating elements is in one direction when these elements point in a northerly direction from the zero position as viewed by an observer attached to the concentrating element, and in the opposite direction when pointing in a southerly direction. That is, it is evident the field reverses when the concentrating element turns from one side to the other of the east-west direction. As the vibrating element 12 is constantly vibrated by the air jet 21 and as it is so arranged that the reluctance of the magnetic path 10—14—12—11 is constantly changed because the air gap 14 is constantly increasing and decreasing, this change in reluctance will cause a change in the strength of the magnetic flux in the magnetic circuit 10—14—12—11, and this change in flux will in turn set up an induced electromotive force in the coils 15 which is alternating. This alternating E. M. F. is rectified by the contact 20 operating in synchronism with the vibrator 12 because it is attached to it, and therefore, moves with it, the contact 20 being shown conventionally as carried by a light spring mounting which gives the necessary lag or retarded breaking of the circuit, and the resulting direct current is impressed upon the indicating device 22. As indicated above it will be obvious that the indicator will show no indications when the flux through the elements 10 and 11 is zero and the direction of indication will reverse if the direction of the flux is reversed. It will also be obvious that the indicator 22 may be mounted at any convenient point where it may be easily observed while the elements 10 and 11 and their associated elements may be mounted at any remote location where they are well clear of magnetic material used in the construction of the vehicle.

Figure 2:
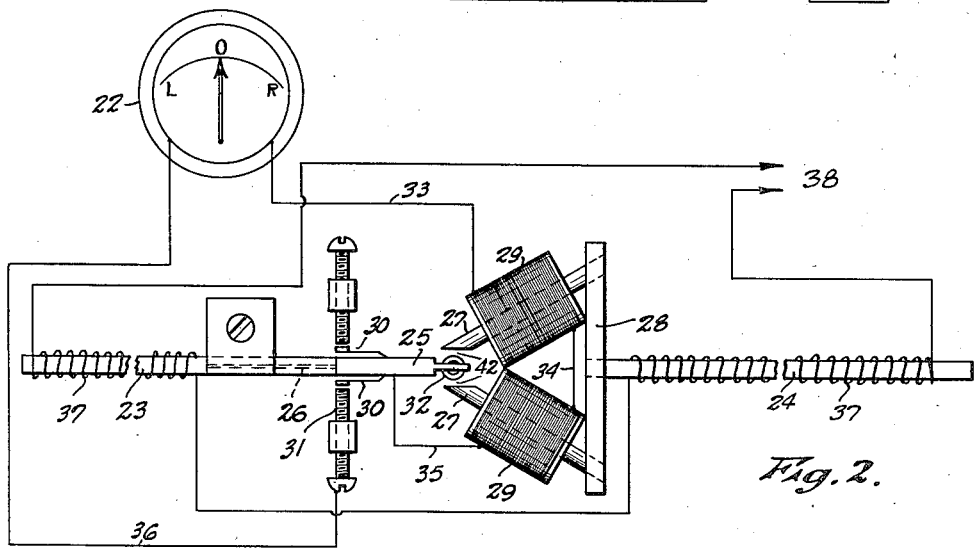
Fig. 2 is a diagrammatical plan view of a somewhat different arrangement and showing the use of a demagnetizing means.
Figure 3:
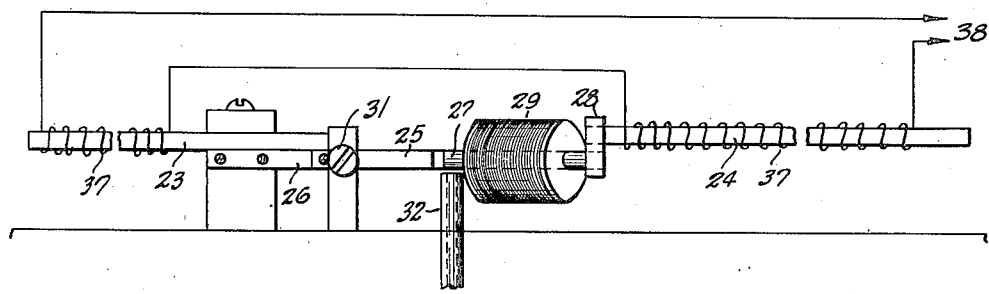
Fig. 3 is a side elevation of the device of Fig. 2.

The form shown in Figs. 2 and 3 is in general substantially the same as that shown in Fig. 1, but includes in addition means for demagnetizing the flux concentrating elements. In this form the flux concentrating elements of magnetic material are shown at 23 and 24. Associated with the element 23 is a vibrating element 25 also of magnetic material and forming part of the path for the magnetic flux. It is mounted by a spring 26 so that it may vibrate back and forth between poles 27 of magnetic material connected by a yoke 28, also of magnetic material, with the element 24. Mounted on these pole pieces are armature coils 29. The vibrating element also carries one or more contacts 30 cooperating with the adjustable contacts 31, and the vibrating element 25 is made to vibrate at a constant frequency by means of an air blast from the tube 32. The indicator comprising the sensitive D. C. meter 22 is connected in the circuit with the coils 29 and the contacts 30 and 31 similar to the arrangement of the first form, and by means of the lead wires 33, 34, 35 and 36. About the concentrating elements 23 and 24 are the demagnetizing windings 37 connected, as indicated at 38, with any suitable source of alternating current, not shown, but may be a transformer, as indicated at 39, Fig. 6, one coil 40 of which is connected to any suitable source of alternating current. The frequency of this oscillating or alternating current should be different from that of the vibrating element so that this current will not materially affect the E. M. F. induced in the armature coils by the variations in the magnetic flux. It will, of course, be understood the demagnetizing means may be employed with the flux concentrating elements of Fig. 1.

The operation of this device is the same as that shown in Fig. 1. The vibration of the member 25 between the pole pieces 27 varies the air gaps 42 between the element and the pole pieces and thus varies the reluctance of the path for the magnetic flux, and therefore, varies the strength of the flux through the elements 27. This variation of the flux will cause an induced E. M. F. in the coils 29 which is rectified by the contact 30 moving in synchronism with the vibrating element, and this rectified current passing through the meter 22 will indicate the amount of deviation of the elements 23 and 24 from a plane perpendicular to the earth's magnetic field, and therefore, the deviation of the vehicle, and also the direction of this deviation. It will, of course, be understood that this device is supported by suitabe mountings for orienting it with respect to the vehicle the same as in the first form.

Figure 5:
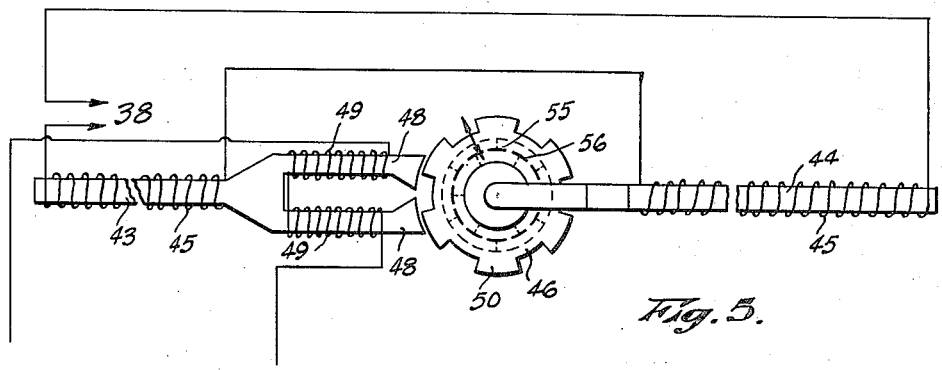
Fig. 5 is a top plan view of this mechanism.
Figure 4:
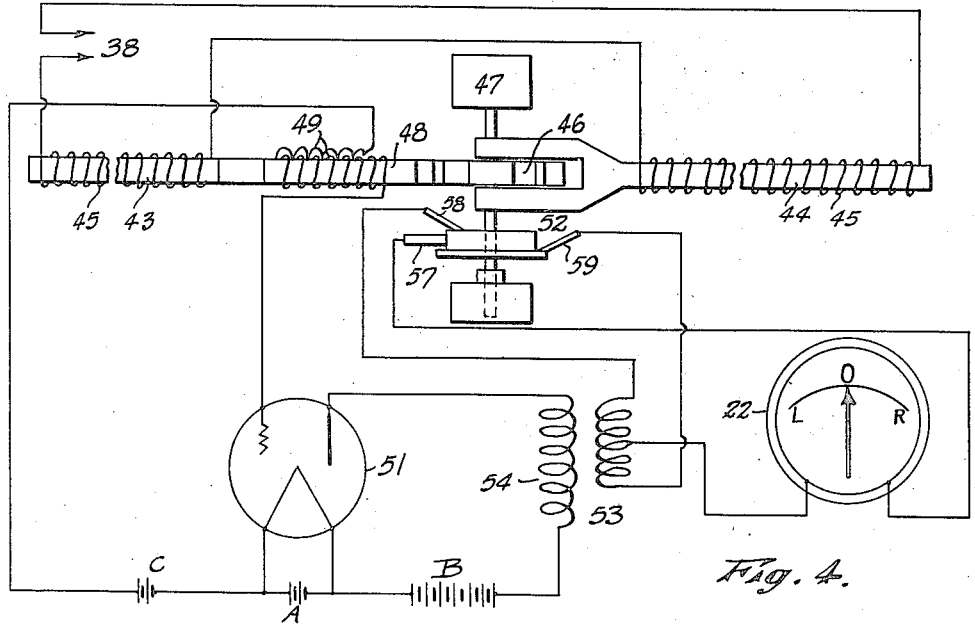
Fig. 4 is a diagrammatical view of still another arrangement showing a part of the mechanism in side elevation.

In Figs. 4 and 5 the vibrating element has been omitted and a rotating toothed wheel substituted. In this form the flux concentrating elements are shown at 43 and 44 comprising the magnetic path, and they may be constantly demagnetized by the windings 45 connected to a suitable source of alternating current, as indicated at 38. In this construction as indicated above, the device for varying the reluctance of the magnetic path or circuit is a toothed wheel 46 also of magnetic material located between the elements 43 and 44, and it is rotated at a constant speed by some suitable means, such as a motor 47. The element 43 of magnetic material includes a yoke 48 which is wound, as shown by the field coils 49, connected in circuit with the indicating device. The reluctance varying device 46 alternately increases and decreases the magnetic flux through one coil 49 and then the other as the teeth 50 of this wheel pass by the ends of the yoke 48 because this movement of the teeth will vary the air gap between the teeth and the end of the yoke. This changing flux sets up an induced E. M. F. in the armature coils 49. In this arrangement, however, this induced E. M. F. in the coils 49 is impressed upon the grid of a vacuum tube amplifier 51 in the well known manner. The output from this vacuum tube amplifier in this case is connected to a synchronous rectifier 52 through a transformer 53, one coil 54 of which is in the plate circuit of the vacuum tube amplifier. This rectifier includes suitable insulated and connected contacts 55 and 56 cooperating with suitable brushes 57, 58 and 59 arranged as shown to conduct the alternating current and the rectified current to and from the synchronous rectifier. The rectified output from the rectifier is connected to the indicator 22 substantially as shown. It will, of course, be obvious that if desired this vacuum tube amplifier may be equally as well used with the two devices shown in Figs. 1 to 3 if found desirable.

Figure 6:
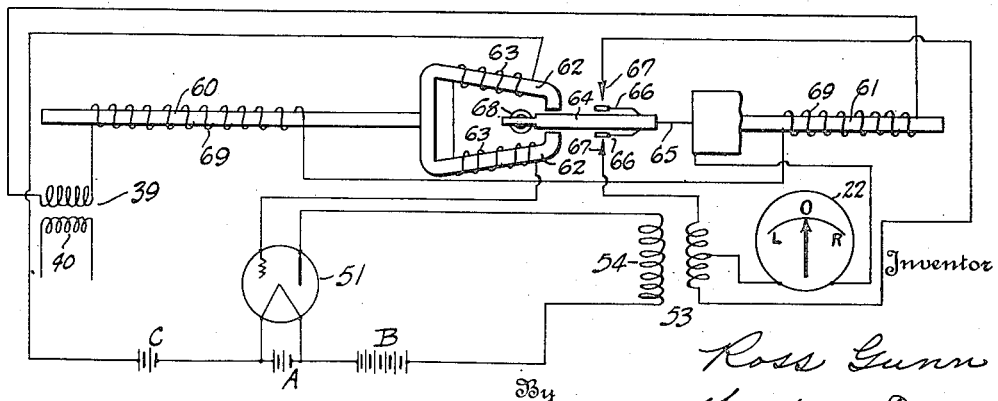
Fig. 6 is a diagrammatical view of still another arrangement.

The form shown in Fig. 6 is substantially the same as that shown in Fig. 2 but includes the use of the vacuum tube amplifier 51. In this form the flux concentrating elements of magnetic material are the members 60 and 61. The element 60 includes a yoke member comprising two pole pieces 62 about which the armature coils 63 are wound. A vibrating element 64 of magnetic material is mounted between these pole pieces and is connected by a spring 65 with the element 61. It carries the movable contacts 66 cooperating with the stationary contacts 67. The coils 64 are connected in circuit with the grid of the vacuum tube 51 so that the E. M. F. induced in these coils by variations in the magnetic flux as the reluctance of the magnetic path is varied will be impressed on the grid of this tube. The plate circuit or output of this tube is connected to the transformer 53 which is connected through the rectifying contacts 66 and 67, operated in synchronism with the vibrator 64, with the indicating device 22, as indicated, so that the rectifying current will operate the indicator. The element 64 is vibrated by means of an air jet from the tube 68.

In this form the flux concentrating elements 60—61 are provided with the demagnetizing windings 69 connected to any suitable source of alternating current, such as the transformer 39, whereby these coils are provided with an alternating current with a frequency different from that of the vibrating element and thus keeps the elements 60—61 demagnetized. It will, of course, be understood that the elements 60—61 of this device are mounted to be properly oriented with the vehicle the same as the other forms.

Having thus set forth the nature of my invention, what I claim is:

1. An orientation indicator comprising a stationary coil, means for concentrating the earth's magnetic flux in the coil, means for periodically varying this magnetic flux through the coil to induce an E. M. F. therein, and an indicating device operated by the E. M. F. induced in the coil.

2. In an orientation indicator, a coil, means associated with said coil for suitably concentrating the earth's magnetic flux, means for periodically demagnetizing said concentrating means, means for periodically varying the magnetic flux through said coil, and means for indicating the induced E. M. F. so produced in the coil.

3. In an orientation indicator, coils, means comprising magnetic material associated with said coils for suitably concentrating the earth's magnetic flux, a demagnetizing winding on said flux concentrating means, means for connecting said demagnetizing winding to a source of alternating current, means for periodically varying the magnetic flux through the said coils, and means for indicating the induced E. M. F. so produced in these coils.

4. A device for use in a compass of the induction type, comprising means providing a magnetic path and for suitably concentrating the earth's magnetic flux in said path, means for producing a change in the reluctance of said magnetic path to thus change the flux, a coil associated with said first mentioned means so that an E. M. F. will be induced therein due to said changing flux, and an indicating device operated by the induced E. M. F.

5. A device for use in a compass of the induction type, comprising a coil, means constituting a magnetic path associated with said coil for suitably concentrating the flux due to the earth's magnetic field, means for periodically varying the reluctance of the path of said flux to thus change the flux whereby an E. M. F. is induced in said coil, means for rectifying the induced E. M. F., and means for indicating the rectified current.

6. A device for use in a compass of the induction type, comprising a coil, means constituting a magnetic path associated with said coil for suitably concentrating the flux due to the earth's magnetic field, means for periodically demagnetizing said means, means for periodically varying the reluctance of the path of said flux to thus change the flux whereby an E. M. F. is induced in said coil, and an indicating device operated by the induced E. M. F.

7. A device for use in a compass of the induction type, comprising a coil, means constituting a magnetic path associated with said coil for suitably concentrating the flux due to the earth's magnetic field, means for periodically demagnetizing said means, means for periodically varying the reluctance of the path of said flux to thus change the flux whereby an E. M. F. is induced in said coil, means for rectifying the induced E. M. F., and means for indicating the rectified current.

8. A device for use in a compass of the induction type, comprising a coil, means constituting a magnetic path associated with said coil for suitably concentrating the flux due to the earth's magnetic field, a demagnetizing winding on said flux concentrating means, means for connecting said winding to a source of alternating current, means for periodically varying the reluctance of the path of said flux to thus change the flux whereby an E. M. F. is induced in the coil due to the changing flux, and means for indicating the induced E. M. F.

9. A device for use in a compass of the induction type, comprising coils, means constituting a magnetic path associated with said coils for suitably concentrating the flux due to the earth's magnetic field, a demagnetizing winding on said flux concentrating means, means for connecting said winding to a source of alternating current to demagnetize the flux concentrating means, means for periodically varying the reluctance of the path of said flux to thus change the flux whereby an E. M. F. is induced in the coils, means for rectifying the induced E. M. F., and means for indicating the rectified current.

10. A device for use in a compass of the induction type, comprising a coil, means constituting a magnetic path associated with said coil for suitably concentrating the flux due to the earth's magnetic field, means for changing the magnitude of this concentrated flux comprising a vibrator forming a part of the flux path and through its movement changing the reluctance of said path, means for rectifying the induced E. M. F. in said coil comprising one or more movable contacts arranged to open and close in synchronism with the movements of the vibrator, and means for producing an indication by the rectified current.

11. A device for use in a compass of the induction type, comprising means constituting a magnetic path for suitably concentrating the magnetic flux due to the earth's field, means for periodically varying the flux by changing the reluctance of its path, a conductor associated with said flux concentrating means in which an E. M. F. is induced by variations in said flux, means for rectifying the induced E. M. F., including make and break contacts one of which has a spring mounting giving a lag to the break and operating in synchronism with the reluctance varying means, and means for producing an indication by means of the rectified current.

12. A device for use in a compass of the induction type, comprising means including magnetic material for suitably concentrating the magnetic flux due to the earth's field, means for constantly demagnetizing said magnetic material, means for periodically varying the flux by changing the reluctance of its path, a conductor associated with said flux concentrating means in which an E. M. F. is induced by variations in said flux, means for rectifying the induced E. M. F., including make and break contacts operating in synchronism with the reluctance varying means, and one of which has a spring mounting to give the required lag to the break and means for producing an indication by means of the rectified current.

In testimony whereof I affix my signature.
ROSS GUNN.